United States Patent
Tanaka et al.

(10) Patent No.: US 12,328,800 B2
(45) Date of Patent: Jun. 10, 2025

(54) HEATER DEVICE

(71) Applicant: DENSO CORPORATION, Kariya (JP)

(72) Inventors: Yusuke Tanaka, Kariya (JP); Hideki Seki, Kariya (JP); Kimitake Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 728 days.

(21) Appl. No.: 17/481,614

(22) Filed: Sep. 22, 2021

(65) Prior Publication Data

US 2022/0007464 A1    Jan. 6, 2022

Related U.S. Application Data (63) Continuation of application No. PCT/JP2020/010844, filed on Mar. 12, 2020.

(30) Foreign Application Priority Data

Mar. 26, 2019 (JP) .................................. 2019-058596

(51) Int. Cl.
    *H05B 1/02*      (2006.01)
    *G01D 5/24*      (2006.01)
    *G05B 15/02*      (2006.01)

(52) U.S. Cl.
    CPC ......... *H05B 1/0238* (2013.01); *G01D 5/2405* (2013.01); *G05B 15/02* (2013.01); *H05B 2203/029* (2013.01)

(58) Field of Classification Search
    CPC ............ H05B 1/0238; H05B 2203/029; H05B 2203/013; H05B 3/12; H05B 3/36;
(Continued)

(56) References Cited

U.S. PATENT DOCUMENTS

2010/0295563 A1*   11/2010   Bieck .................. B60R 21/0152
                                                     324/679
2012/0276831 A1*   11/2012   Wang ................. B60H 1/00871
                                                        454/75
(Continued)

FOREIGN PATENT DOCUMENTS

JP             5040376 B2     10/2012
JP         2014003000 A      1/2014
(Continued)

*Primary Examiner* — Phuong H Nguyen
(74) *Attorney, Agent, or Firm* — Harness, Dickey & Pierce, P.L.C.

(57) ABSTRACT

A heater device for heating an user's body seated on a seat includes a heat generating portion that is arranged in a recess recessed from a surface of the seat, and generates heat by energization, a distance detection unit that detects a distance between an object around the heat generating portion and the heat generating portion, and a control unit that controls energization of the heat generating portion. A first control portion controls energization amount of the heat generating portion so that the output of the heat generating portion becomes equal to or higher than a predetermined output, when the distance is longer than an offset distance between the heat generating portion and the surface of the seat. A second control portion controls the energization amount so that the output becomes less than the predetermined output, when the distance is equal to or less than the offset distance.

12 Claims, 6 Drawing Sheets

(58) Field of Classification Search
CPC ........ G01D 5/2405; G05B 15/02; A47C 7/74; B60H 1/00; B60H 1/22; B60N 2/56
See application file for complete search history.

(56) References Cited

U.S. PATENT DOCUMENTS

| | | | |
|---|---|---|---|
| 2013/0113239 A1* | 5/2013 | Akaike | ................ B60N 2/5685 |
| | | | 297/180.1 |
| 2015/0110477 A1 | 4/2015 | Ota et al. | |
| 2017/0210259 A1* | 7/2017 | Iwata | ................ G01G 19/4142 |
| 2021/0213856 A1 | 7/2021 | Fujii et al. | |

FOREIGN PATENT DOCUMENTS

| | | | |
|---|---|---|---|
| JP | 5708448 B2 | 4/2015 | |
| WO | WO-2016117376 A1 | 7/2016 | |

* cited by examiner

HEATER DEVICE

CROSS REFERENCE TO RELATED APPLICATION

This application is a continuation application of International Patent Application No. PCT/JP2020/010844 filed on Mar. 12, 2020, which designated the U.S. and based on and claims the benefits of priority of Japanese Patent Application No. 2019-058596 filed on Mar. 26, 2019. The entire disclosure of all of the above applications is incorporated herein by reference.

TECHNICAL FIELD

The present disclosure relates to a heater device that heats a body of an occupant seated in a vehicle seat.

BACKGROUND

Conventionally, a vehicle seat and a heater device are known.

SUMMARY

An object of the present disclosure is to provide a sufficient feeling of heating to a portion of the occupant's body that is not in contact with the vehicle seat, and to reduce the thermal discomfort given to the occupant.

According to one aspect of the present disclosure, a heater device for heating an user's body seated on a seat includes a heat generating portion that is arranged in a recess recessed from a surface of the seat, and generates heat by energization, a distance detection unit that detects a distance between an object around the heat generating portion and the heat generating portion, and a control unit that controls the energization of the heat generating portion. The control unit includes a first control portion that controls an energization amount of the heat generating portion so that the output of the heat generating portion becomes equal to or higher than a predetermined output, when the distance detected by the distance detection unit is longer than an offset distance between the heat generating portion and the surface of the seat, and a second control portion that controls energization amount of the heat generating portion so that output of the heat generating portion becomes less than a predetermined output, when the distance detected by the distance detection unit is equal to or less than the offset distance.

DETAILED DESCRIPTION

In an assumable example, a vehicle seat is known. The seat includes a seat main body, a heat generating portion provided on the seat body, and a degree of contact measuring portion that measures a degree of contact between the seat main body and an occupant seated on the seat main body. The seat is further provided with a control portion that controls an amount of heat output from the heat generating portion such that the amount of heat increases according to an increase in the degree of contact between the seat main body and the occupant.

However, according to a study of present discloser, the seat cannot give a sufficient feeling of heating to a portion of the occupant's body that does not come into contact with the seat main body. For example, it is not possible to give a sufficient feeling of heating around a neck of the occupant. Therefore, the present discloser has conceived that a heater device for heating a portion of the occupant's body that does not come into contact with the seat main body is provided on the vehicle seat so that the occupant's body is heated in a non-contact manner with the heater device.

As a result of studying such a heater device by the present discloser, it has been found that it is necessary to output a temperature of about 100° C. as a heater output in order to give a sufficient heating feeling to the occupant.

However, when the heater device outputs such a high temperature, the occupant is given thermal discomfort when the occupant's body approaches the heater device.

An object of the present disclosure is to provide a sufficient feeling of heating to a portion of the occupant's body that is not in contact with the vehicle seat, and to reduce the thermal discomfort given to the occupant.

According to one aspect of the present disclosure, a heater device for heating an user's body seated on a seat includes a heat generating portion that is arranged in a recess recessed from a surface of the seat, and generates heat by energization, a distance detection unit that detects a distance between an object around the heat generating portion and the heat generating portion, and a control unit that controls the energization of the heat generating portion. The control unit includes a first control portion that controls an energization amount of the heat generating portion so that the output of the heat generating portion becomes equal to or higher than a predetermined output, when the distance detected by the distance detection unit is longer than an offset distance between the heat generating portion and the surface of the seat, and a second control portion that controls energization amount of the heat generating portion so that output of the heat generating portion becomes less than a predetermined output, when the distance detected by the distance detection unit is equal to or less than the offset distance.

According to such a configuration, when the distance detected by the distance detection unit is longer than the offset distance between the heat generating portion and a surface of the seat, the control unit controls the energization amount of the heat generating portion so that the output of the heat generating portion exceeds a predetermined output. When the distance detected by the distance detection unit is equal to or less than the offset distance, the control unit controls the energization amount of the heat generating portion so that the output of the heat generating portion becomes less than the predetermined output. Therefore, it is possible to give a sufficient feeling of heating to a portion of the occupant's body that is not in contact with the vehicle seat, and to reduce a thermal discomfort given to the occupant.

A reference numeral in parentheses attached to each configuration element or the like indicates an example of correspondence between the configuration element or the like and the specific configuration element or the like described in embodiments below.

Hereinafter, embodiments will be described with reference to the drawings. In the following embodiments, identical or equivalent elements are denoted by the same reference numerals as each other in the figures.

First Embodiment

Figure 1:
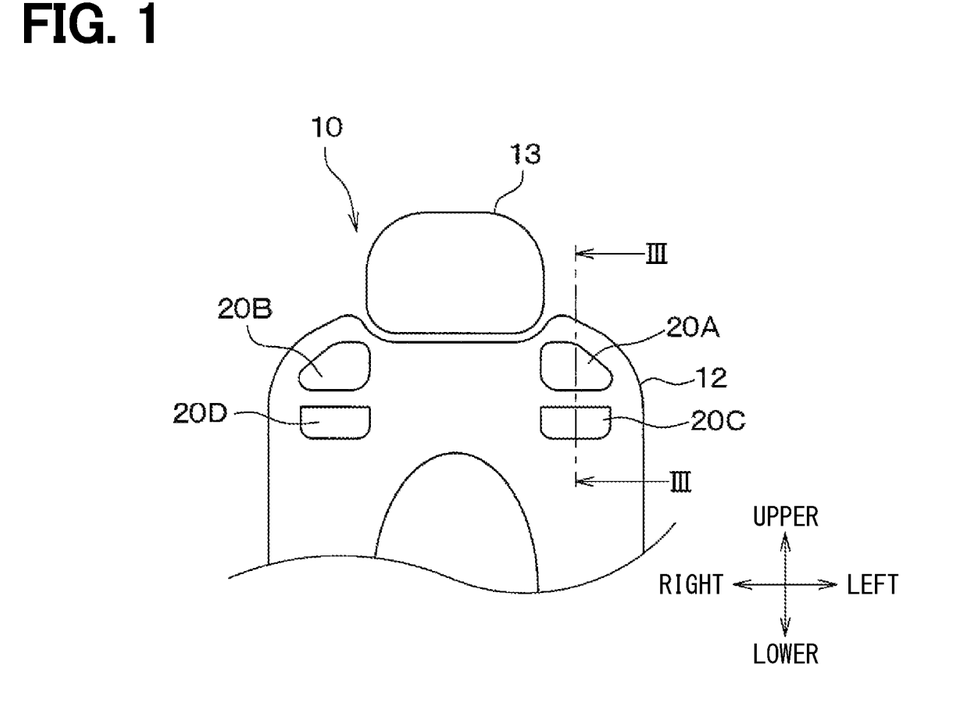
FIG. 1 is a view of a vehicle seat provided with a heater device of a first embodiment as viewed from a front side of a vehicle.
Figure 2:
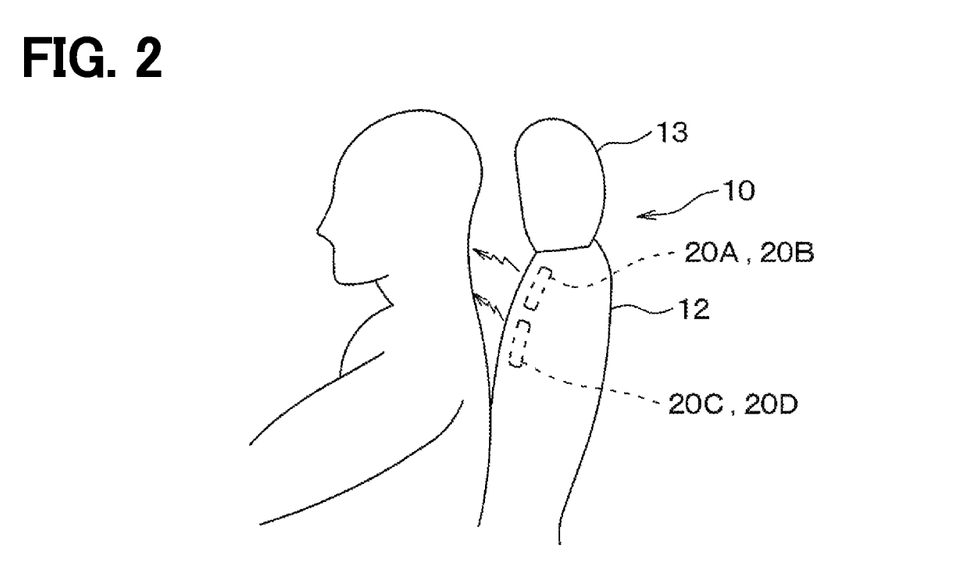
FIG. 2 is a view of a vehicle seat provided with the heater device of the first embodiment as viewed from a left side of the vehicle.
Figure 3:
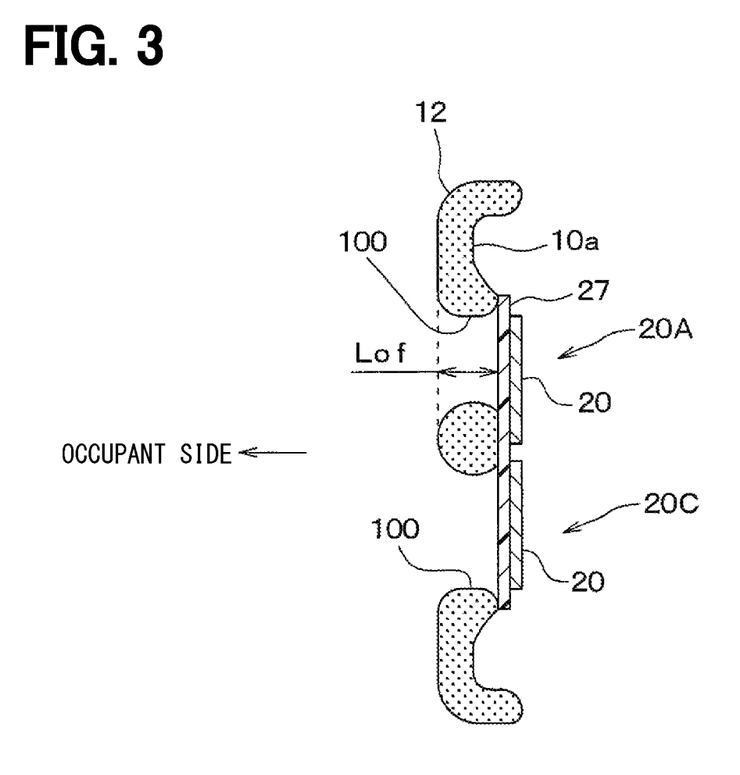
FIG. 3 is a cross-sectional view taken along a line III-III in FIG. 1.

A heater device according to a first embodiment is described with reference to FIGS. 1 to 11. The heater device is arranged on a vehicle seat 10 mounted on a vehicle. As shown in FIGS. 1 and 2, the vehicle seat 10 includes a seat back 12 that supports an entire back of an occupant and a headrest 13 that supports a back of an occupant's head. As shown in FIG. 3, the seat back 12 is configured so that a pad material 10a made of a cushion material such as urethane foam is covered with a skin material such as synthetic leather or cloth.

As shown in FIG. 1, the heater device of the present embodiment includes a first planar heater 20A, a second planar heater 20B, a third planar heater 20C, and a fourth planar heater 20D. The first to fourth planar heaters 20A to 20D are arranged on upper side of the seat back 12.

Further, the first planar heater 20A and the third planar heater 20C are arranged on the left side of the seat back 12 in a left-right direction, respectively. Further, the first planar heater 20A is arranged on the upper side with respect to the third planar heater 20C in an upper-lower direction. The first planar heater 20A and the third planar heater 20C heat the seat back 12 from the left side in the left-right direction around a nape of the occupant in a non-contact manner.

Further, the second planar heater 20B and the fourth planar heater 20D are arranged on the right side of the seat back 12 in the left-right direction, respectively. Further, the second planar heater 20B is arranged on the upper side with respect to the fourth planar heater 20D in the upper-lower direction. The first planar heater 20A and the third planar heater 20C heat the seat back 12 from the right side in the left-right direction around the nape of the occupant in the non-contact manner.

The first planar heater 20A and the second planar heater 20B arranged on the upper side in the upper-lower direction of the seat back correspond to a first heat generating portion, and the third planar heater 20C and the fourth planar heater 20D arranged on the lower side in the upper-lower direction with respect to the first heat generating portion correspond to a second heat generating portion.

As shown in FIG. 3, the seat back 12 is formed with a recess 100 recessed from a surface thereof. The first planar heater 20A and the third planar heater 20C are arranged at positions recessed from the surface of the seat back 12 in the recess 100 formed in the seat back 12, respectively.

Further, the second planar heater 20B and the fourth planar heater 20D are arranged at positions recessed from the surface of the seat back 12 in the recess 100 formed in the seat back 12, respectively, similar to the first planar heater 20A and the third planar heater 20C.

That is, the first to fourth planar heaters 20A to 20D are arranged in the seat back 12 where does not come into contact with the occupant's body when the occupant is seated on the vehicle seat 10.

As shown in FIG. 3, the first planar heater 20A and the third planar heater 20C each include a heater main body 20. In the heater device of the present embodiment, the heater main body 20 of the first planar heater 20A and the heater main body 20 of the third planar heater 20C are fixed to the recess 100 of the seat back 12 via a support member 27.

Although not shown, the second planar heater 20B and the fourth planar heater 20D each include a heater main body 20. In the heater device of the present embodiment, the heater main body 20 of the second planar heater 20B and the heater main body 20 of the fourth planar heater 20D are fixed to the recess 100 of the seat back 12 via the support member 27.

Figure 4:
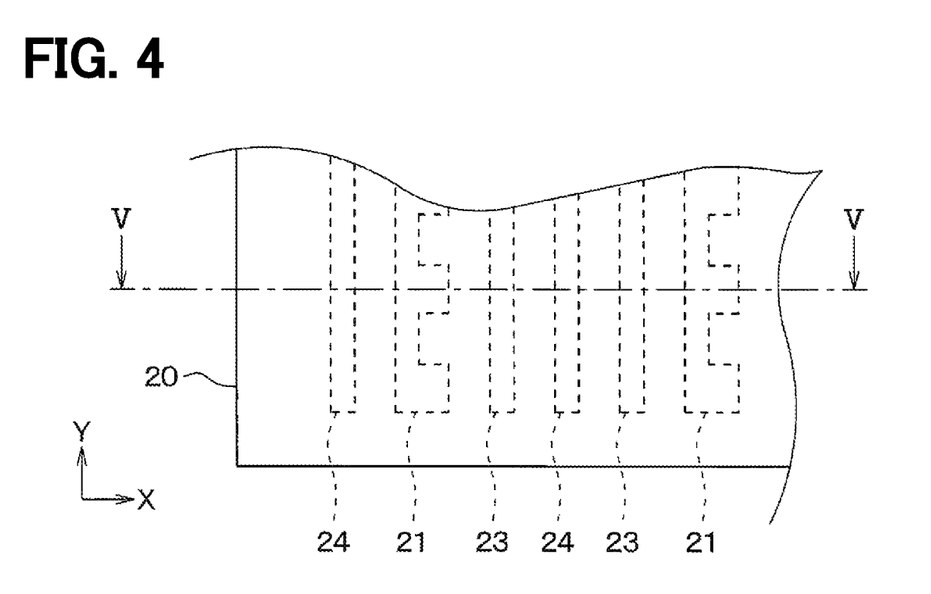
FIG. 4 is a front view of a part of the heater main body.
Figure 5:
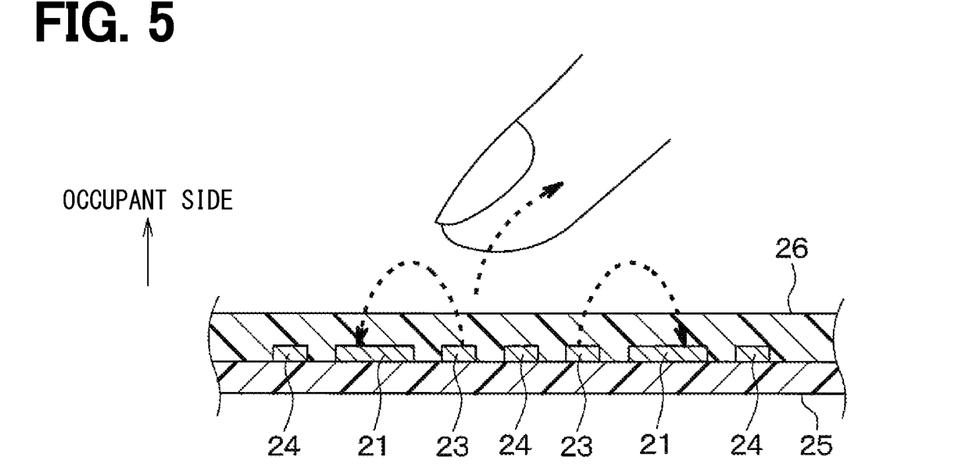
FIG. 5 is a cross-sectional view taken along the line V-V in FIG. 4.

Next, a configuration of the heater main body 20 will be described with reference to FIGS. 4 and 5. As shown in FIGS. 4 to 5, the heater main body 20 includes a receiving electrode 21, a transmitting electrode 23, a heat generating portion 24, an insulation substrate 25, and a cover member 26. The insulation substrate 25 corresponds to a board. The heater main body 20 is configured as a thin sheet heater and efficiently radiates radiant heat.

The insulation substrate 25 is composed of a plate-shaped member extending along an XY plane defined by an axis X and an axis Y. The insulation substrate 25 has a thickness in the direction of an axis Z in the XY plane. The insulation substrate 25 is formed in a substantially quadrangular thin plate shape. The insulation substrate 25 is made of a resin material having high insulating properties and withstanding high temperatures, for example, a polyimide film. The receiving electrode 21, the transmitting electrode 23, and the heat generating portion 24 are formed on the surface of the insulation substrate 25 on an occupant side.

The receiving electrode 21, the transmitting electrode 23, and the heat generating portion 24 are made of a thin copper film, and the heater device is made thinner and has a lower heat capacity. Further, by reducing the heat capacity, the temperature of the heat generating portion 24 can be rapidly raised by energization. Further, when an object comes into contact with the heater main body 20, the temperature of a contacted portion can be rapidly lowered. The transmitting electrodes 23 are arranged at a predetermined distance from the receiving electrodes 21.

The heat generating portion 24 is linear and is formed so as to meander on one surface of the insulation substrate 25. The heat generating portion 24 radiates radiant heat that makes the occupant feel warm by energizing by the control unit 29. The heat generating portion 24 is made of a material having a high thermal conductivity. For example, the heat generating portion 24 may be made of copper, alloy of copper and tin (Cu—Sn), a metal such as silver, tin, stainless steel, nickel, and nichrome, or alloy including at least one of silver, tin, stainless steel, nickel or nichrome.

The cover member 26 protects the receiving electrode 21, the transmitting electrode 23, and the heat generating portion 24. The cover member 26 and the insulation substrate 25 are composed of a low thermal conductive member having a lower thermal conductivity than the receiving electrode 21, the transmitting electrode 23, and the heat generating portion 24. The cover member 26 is arranged so as to cover the heat generating portion 24 on one surface of the insulation substrate 25. Thereby, when the object comes into contact with the heater main body 20, the temperature of the contacted portion can be quickly lowered.

The heater main body 20 of the present embodiment is configured as a mutual capacitive sensor. Next, an operation principle of the mutual capacitive sensor will be described with reference to FIGS. 6 and 7. Here, it will be described as the capacitive sensor having the transmitting electrode 23 and the receiving electrode 21.

Figure 6:
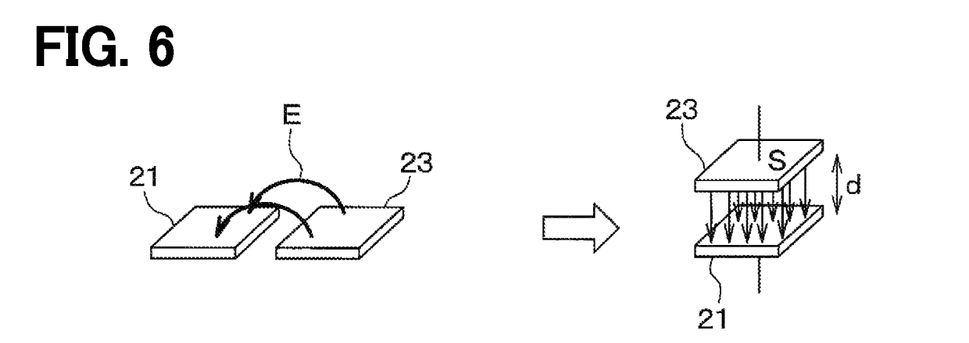
FIG. 6 is a diagram for explaining an operating principle of a mutual capacitive sensor.

A schematic diagram of the transmitting electrode 23 and the receiving electrode 21 is illustrated on the left side in FIG. 6, and an equivalent circuit of the transmitting electrode 23 and the receiving electrode 21 is illustrated on the right side in FIG. 6.

As shown on the left side in FIG. 6, the transmitting electrode 23 and the receiving electrode 21 are adjacent to each other in the mutual capacitive sensor. An electric field is created between the transmitting electrode 23 and the receiving electrode 21 when voltage is applied between the transmitting electrode 23 and the receiving electrode 21.

A capacitance C between the transmitting electrode 23 and the receiving electrode 21 can be expressed as in Equation 1, where c is a permittivity between the transmitting electrode 23 and the receiving electrode 21, S is an area of one electrode, and d is a distance between the electrodes.

$$C = \frac{\varepsilon \cdot S}{d} \quad \text{[Equation 1]}$$

Figure 7:
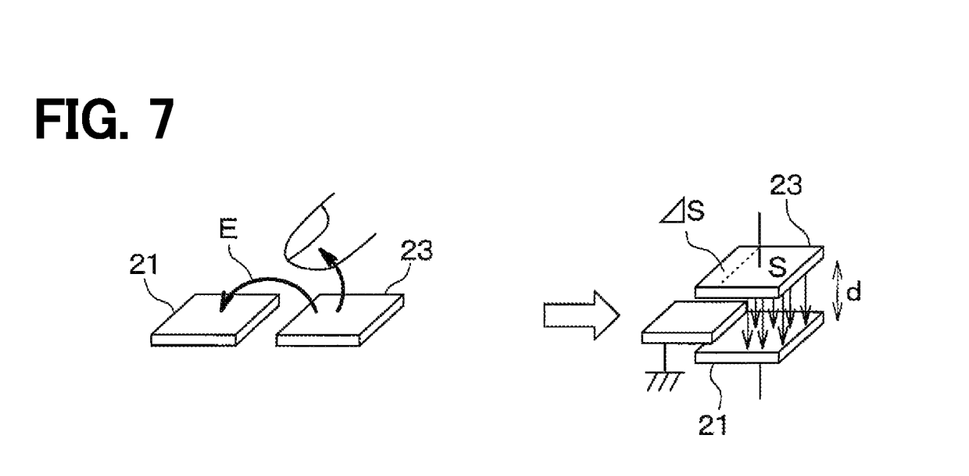
FIG. 7 is a diagram for explaining an operating principle of a mutual capacitive sensor.

When a finger that is a part of a human body approaches as an object around the electrode, a part of the field line is absorbed by the finger as shown on the left side in FIG. 7, and accordingly the electric field received by the receiving electrode 21 decreases. As shown on the right side in FIG. 7, this situation can be regarded as same to a situation where a grounded object is inserted between the transmitting electrode 23 and the first receiving electrode 21.

In this case, the capacitance C between the transmitting electrode 23 and the receiving electrode 21 can be expressed as in Equation 2, where $\Delta S$ is an area of the grounded object overlapping the electrodes.

$$C' = \frac{\varepsilon \cdot (S - \Delta S)}{d} \quad \text{[Equation 2]}$$

That is, the contiguity of the finger can be detected by determining the difference between the capacitance C expressed in the equation 1 and the capacitance C' expressed in the equation 2.

Figure 8:
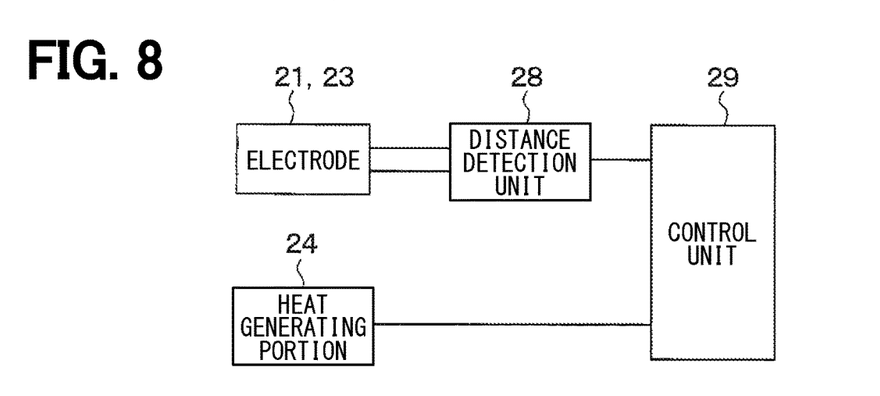
FIG. 8 is a block diagram of the heater device of the first embodiment.

Next, the heater device of the present embodiment will be described with reference to the block diagram of FIG. 8. A distance detection unit 28 is connected to the receiving electrode 21 and the transmitting electrode 23.

The distance detection unit 28 of the present embodiment detects whether or not a distance between the object around the heat generating portion 24 and the heat generating portion 24 is equal to or less than a first detection distance L1 based on the change in capacitance between the transmitting electrode 23 and the receiving electrode 21. Further, the distance detection unit 28 detects whether or not the distance between the object around the heat generating portion 24 and the heat generating portion 24 is equal to or greater than an offset distance between the heat generating portion 24 and the surface of the seat back 12. Here, the offset distance refers to a distance between the heat generating portion 24 and an opening surface of the recess 100 formed in the seat back 12. The offset distance is preferably set to about 5 mm to 50 mm. For example, when the occupant leans against the seat back 12 and the occupant's body closes the opening surface of the recess 100 formed in the seat back 12, the distance between the occupant's body and the heat generating portion 24 becomes the same as the offset distance. Further, when the occupant leans against the seat back 12 and the seat back 12 is pressed and deformed, the distance between the occupant's body and the heat generating portion 24 becomes shorter than the offset distance.

The distance detection unit 28 outputs a signal indicating whether or not the distance between the object and the heat generating portion 24 is equal to or less than the first detection distance L1 and a signal indicating whether or not the distance between the object and the heat generating portion 24 is equal to or greater than the offset distance, to the control unit 29.

The control unit 29 is configured as a computer equipped with a CPU, a memory, an I/O, and the like, and the CPU executes various processes according to a program stored in the memory. The control unit 29 performs a process of controlling the energization of the heat generating portion 24 based on the signal output from the distance detection unit 28. The memory is a non-transitory tangible storage medium.

Figure 9:
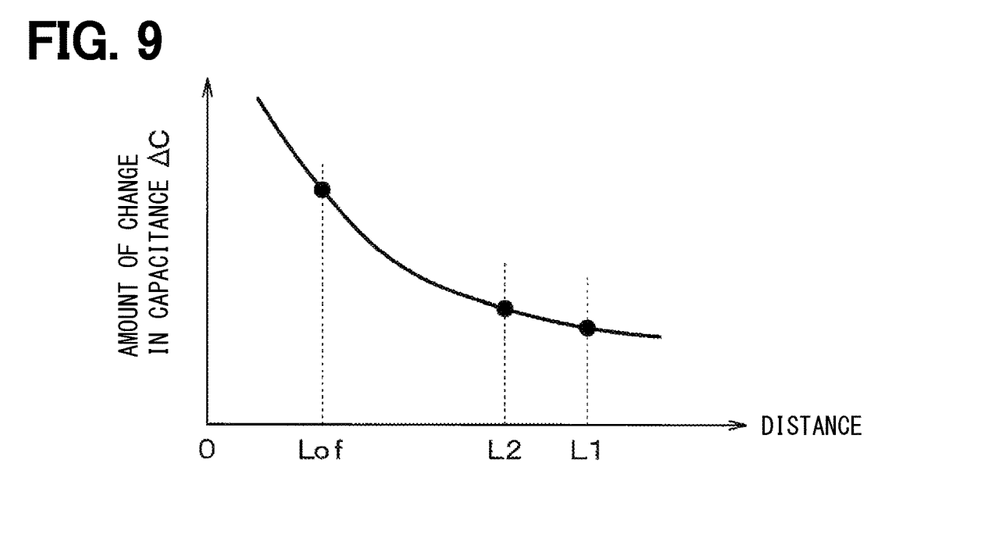
FIG. 9 is a diagram showing a change in capacitance with respect to a distance between the heater device of the first embodiment and an object.

FIG. 9 shows a relationship of the change $\Delta C$ of the capacitance between the receiving electrode 21 and the transmitting electrode 23 with respect to the distance L from the object in the heater device of the present embodiment. The shorter the distance L to the object, the larger the change $\Delta C$ of each capacitance.

The distance detection unit 28 detects whether or not a distance between the object around the heat generating portion 24 and the heat generating portion 24 is equal to or less than a first detection distance L1, or is equal to or less than the second detection distance L2 based on the change $\Delta C$ of the capacitance between the receiving electrode 21 and the transmitting electrode 23. Further, the distance detection unit 28 detects whether or not the distance between the object and the heat generating portion 24 is equal to or less than the offset distance Lof between the heat generating portion 24 and the surface of the seat back 12.

Figure 10:
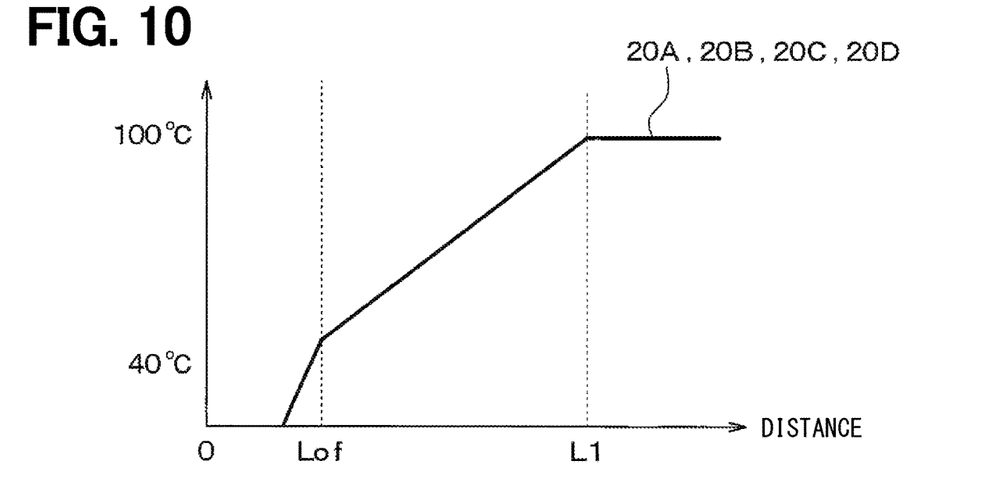
FIG. 10 is a diagram showing a heater output with respect to the distance between the heater device of the first embodiment and the object.

FIG. 10 shows an output characteristics of the first to fourth planar heaters 20A to 20D of the heater device of the present embodiment. A horizontal axis shows the distance between the heat generating portion 24 and the object, and a vertical axis shows the heater temperature. The control unit 29 controls the energization of the heat generating portions 24 of the first to fourth planar heaters 20A to 20D so as to obtain the heater output shown in FIG. 10.

Figure 11:
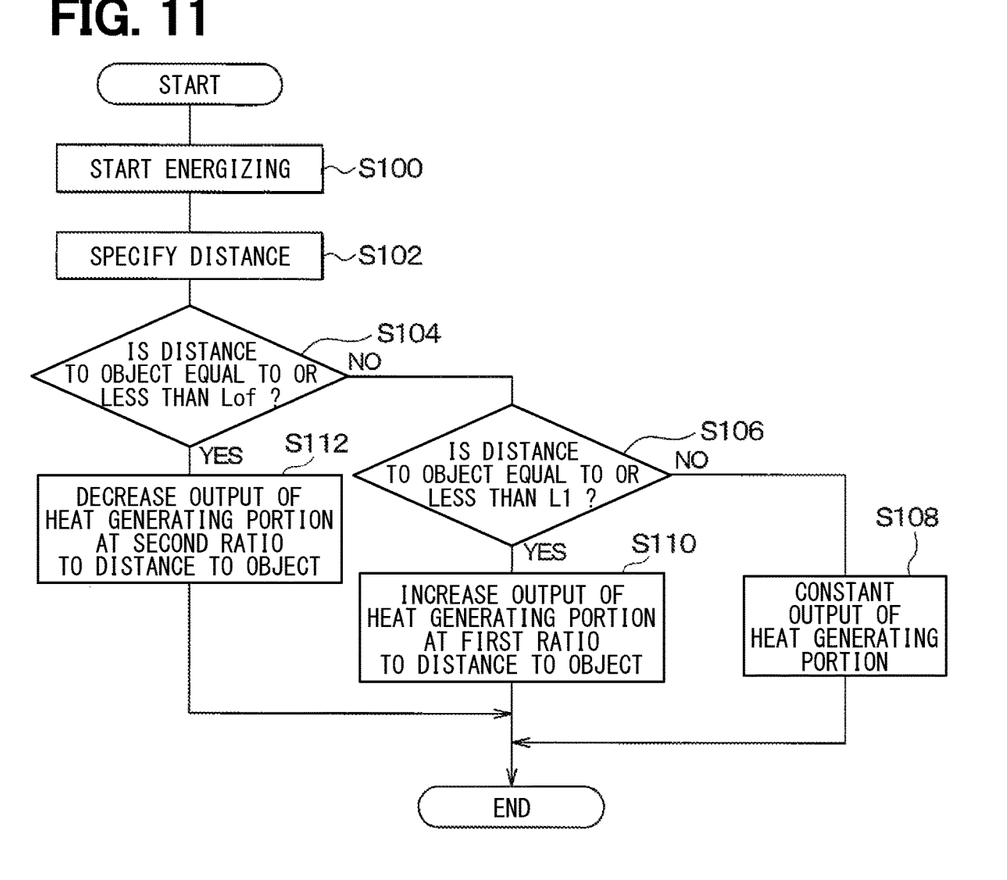
FIG. 11 is a flowchart in a control unit.

Next, a processing of the control unit 29 will be described with reference to the flowchart of FIG. 11. This processing starts as soon as the heater device is turned on. When the power of the heater device is turned on, the control unit 29 starts energizing each of the heat generating portions 24 of the first to fourth planar heaters 20A to 20D in S100. As a result, the heat generating portions 24 generate heat.

First, in S102, the control unit 29 specifies the distance between the object around the heat generating portion 24 and the heat generating portion 24. Specifically, the control unit 29 specifies whether the distance between the object around the heat generating portion 24 and the heat generating portion 24 is longer than the first detection distance L1, or the distance is equal to or less than the first detection distance L1 and longer than the offset distance Lof, or the distance is equal to or less than the offset distance. Further, the control unit 29 determines in S104 whether or not the distance between the object around the heat generating portion 24 and the heat generating portion 24 is equal to or less than the offset distance Lof.

Further, the control unit 29 determines in S106 whether or not the distance between the object around the heat generating portion 24 and the heat generating portion 24 is equal to or less than the first detection distance L1.

Here, when the occupant's body is sufficiently separated from the heat generating portion 24 and the distance between the object around the heat generating portion 24 and the heat generating portion 24 is longer than the first detection distance L1, the process proceeds to S108. In S108, the control unit 29 controls the output of each of the heat generating portions 24 of the first to fourth planar heaters 20A to 20D to a constant output regardless of the distance L between the object and the heat generating portion 24.

Further, when the occupant's body approaches the heat generating portion 24 and the distance between the object around the heat generating portion 24 and the heat generating portion 24 is equal to or less than the first detection distance L1 and longer than the offset distance Lof, the control unit 29 controls the energization amount of each of the heat generating portions 24 of the first to fourth planar heaters 20A to 20D in S110. That is, the energization amount of the heat generating portion 24 is controlled so that the output of the heat generating portion 24 increases as the distance L between the object and the heat generating portion 24 increases. Specifically, the energization amount of the heat generating portion 24 is controlled so as to increase at a first ratio with respect to the increase in the distance between the object and the heat generating portion 24. That is, the energization amount of the heat generating portion 24 is controlled so as to decrease at the first ratio with respect to the decrease in the distance between the object and the heat generating portion 24.

Further, when the occupant's body closes the heat generating portion 24 and the opening surface of the recess 100 formed in the seat back 12, and the distance between the object around the heat generating portion 24 and the heat generating portion 24 becomes equal to or less than the offset distance Lof, the control unit 29 controls the energization amount of each of the heat generating portions 24 of the first to fourth planar heaters 20A to 20D in S112. That is, the energization amount of the heat generating portion 24 is controlled so that the output of the heat generating portion 24 becomes smaller as the distance between the object and the heat generating portion 24 becomes shorter. Specifically, the energization amount of the heat generating portion 24 is controlled so that the output of the heat generating portion 24 decreases at a second ratio larger than the first ratio with respect to the decrease in the distance between the object and the heat generating portion 24.

As described above, the heater device of the present embodiment is arranged in a recess recessed from the surface of the vehicle seat 10, and includes the heat generating portion 24 that generates heat by energization, and the distance detection unit 28 that detects the distance between the object around the heat generating portion 24 and the heat generating portion 24. Further, the heater device includes the control unit 29 that controls the energization of the heat generating portion. Then, the control unit 29 includes a first control portion (S110, S108). The first control portion controls the energization amount of the heat generating portion 24 so that the output of the heat generating portion 24 becomes equal to or higher than a predetermined output, when the distance detected by the distance detection unit 28 is longer than the offset distance Lof between the heat generating portion 24 and the surface of the seat. Further, the control unit 29 includes a second control portion (S112). The second control portion controls the energization amount of the heat generating portion 24 so that the output of the heat generating portion 24 becomes less than a predetermined output, when the distance detected by the distance detection unit 28 is equal to or less than the offset distance Lof.

Therefore, it is possible to provide a sufficient feeling of heating to a portion of the occupant's body that is not in contact with the vehicle seat 10, and to reduce the thermal discomfort given to the occupant.

Further, the first control portion controls the energization amount of the heat generating portion 24 so that the output of the heat generating portion 24 increases as the distance between the object and the heat generating portion 24 increases. Therefore, the user (occupant) can obtain a sufficient feeling of heating even when the occupant's body is separated from the vehicle seat 10.

Further, the first control portion controls the energization amount of the heat generating portion so that the output of the heat generating portion decreases at the first ratio with respect to the decrease in the distance between the object and the heat generating portion. Further, the second control portion controls the energization amount of the heat generating portion so that the output of the heat generating portion decreases at the second ratio larger than the first ratio with respect to the decrease in the distance between the object and the heat generating portion.

In this way, the second control unit controls the energization amount of the heat generating portion so that the output of the heat generating portion decreases at the second ratio larger than the first ratio with respect to the decrease in the distance between the object and the heat generating portion. Therefore, it is possible to quickly reduce the thermal discomfort given to the occupants.

Further, the heater device includes a plurality of electrodes 21 and 23 for detecting a change in capacitance due to the object around the heat generating portion 24. Then, the distance detection unit 28 detects the distance based on the change in the capacitance between the plurality of electrodes 21 and 23.

In this way, the distance detection unit 28 detects the distance based on the change in capacitance between the plurality of electrodes 21 and 23, so that the distance between the object around the heat generating portion 24 and the heat generating portion can be accurately detected.

Further, the heater device incudes the insulation substrate 25 on which the heat generating portion 24 is formed, and the cover member 26 which is arranged so as to cover the heat generating portion 24 on one surface of the insulation substrate 25 as a low thermal conductive portion having a lower thermal conductivity than the heat generating portion 24.

Therefore, when the user's body comes into contact with the cover member 26, the temperature of the contacted portion can be quickly lowered.

Further, the heater device includes a plurality of planar heaters 20A to 20D having the heat generating portion 24. As described above, a plurality of planar heaters 20A to 20D having the heat generating portion 24 can be provided.

Further, the vehicle seat 10 has the seat back 12 that supports the entire back of the user. The plurality of planar heaters 20A to 20D are arranged on the upper side of the center of the seat back 12 in the upper-lower direction.

In this way, it is possible to heat the occupant's body without contact, since the plurality of planar heaters 20A to 20D are arranged on the upper side of the center in the upper-lower direction of the seat back 12.

Further, the plurality of planar heaters 20A to 20D include the first planar heater 20A and the second planar heater 20B as upper side planar heaters, and the third planar heater 20C and the fourth planar heater 20D as lower side planar heaters. The third planar heater 20C is arranged side by side on the lower side in the upper-lower direction with respect to the first planar heater, and the fourth planar heater 20D is arranged side by side on the lower side in the upper-lower direction with the second planar heater 20B. In this way, the upper side planar heater and the lower side planar heater can be arranged side by side in the upper-lower direction.

Second Embodiment

Figure 12:
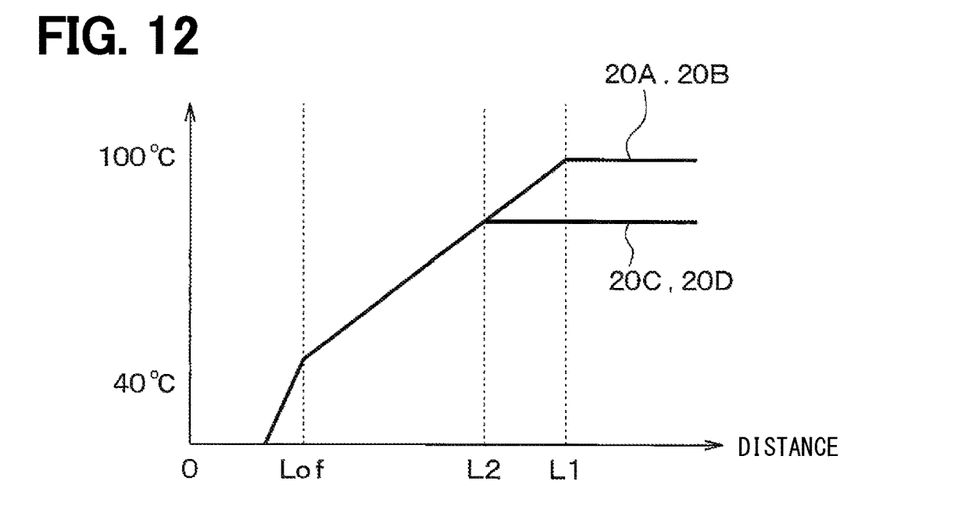
FIG. 12 is a diagram showing a change in capacitance with respect to a distance between the heater device of a second embodiment and an object.

The heater device according to a second embodiment will be described with reference to FIG. 12. As shown in FIG. 10, the control unit 29 of the first embodiment controls the heater temperatures of the first to fourth planar heaters 20A to 20D to be the same. On the other hand, as shown in FIG. 12, the control unit 29 of the present embodiment controls the heater temperature of the second planar heater 20B and the fourth planar heater 20D as the lower side planar heaters when the distance between the object and the heat generating portion 24 is longer than the second detection distance L2, as follows. That is, the heater temperatures of the second planar heater 20B and the fourth planar heater 20D as the lower side planar heaters are different from the heater temperature of the first planar heater 20A and the third planar heater 20C as the upper side planar heaters.

Since the second planar heater 20B and the fourth planar heater 20D are arranged on the lower side the first planar heater 20A and the third planar heater 20C in the upper-lower direction, the second planar heater 20B and the fourth planar heater 20D are more likely to come into contact with the occupant's body than the first planar heater 20A and the third planar heater 20C.

Therefore, the control unit 29 controls the heater temperatures of the second planar heater 20B and the fourth planar heater 20D to be lower than the heater temperatures of the first planar heater 20A and the third planar heater 20C.

In this way, the control unit 29 can control the energization of the first heat generating portion so that the heat generating amount of the first heat generating portion is larger than the heat generating amount of the second heat generating portion. Therefore, it is possible to give the user a comfortable feeling of heating.

The present embodiment can achieve the effects and advantages, which are obtained from the structure common to the first embodiment.

Third Embodiment

Figure 13:
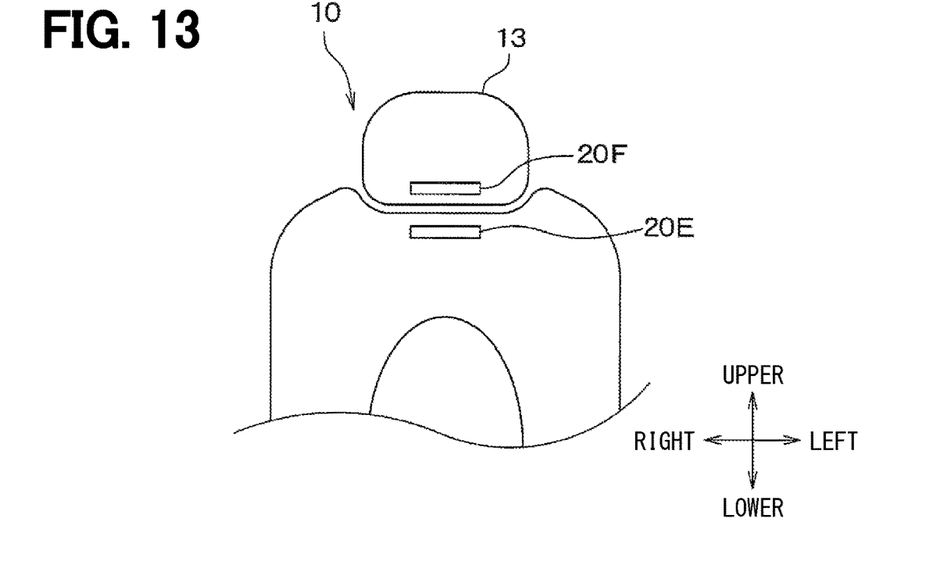
FIG. 13 is a view of a vehicle seat provided with the heater device of a third embodiment as viewed from the front side of the vehicle.

The heater device according to a third embodiment will be described with reference to FIG. 13. In the heater device of the first embodiment, the first planar heater 20A and the third planar heater 20C are arranged on the left side of the seat back 12 in the left-right direction, and the second planar heater 20B and the fourth planar heater 20D are arranged on the right side of the seat back 12 in the left-right direction. On the other hand, in the heater device of the present embodiment, a fifth planar heater 20E is arranged at the center of the seat back 12 in the left-right direction, and a sixth planar heater 20F is located at the center of the headrest 13 in the left-right direction.

In this way, the fifth planar heater 20E can be arranged at the center of the seat back 12 in the left-right direction, and the sixth planar heater 20F can be arranged at the center of the headrest 13 in the left-right direction.

Figure 14:
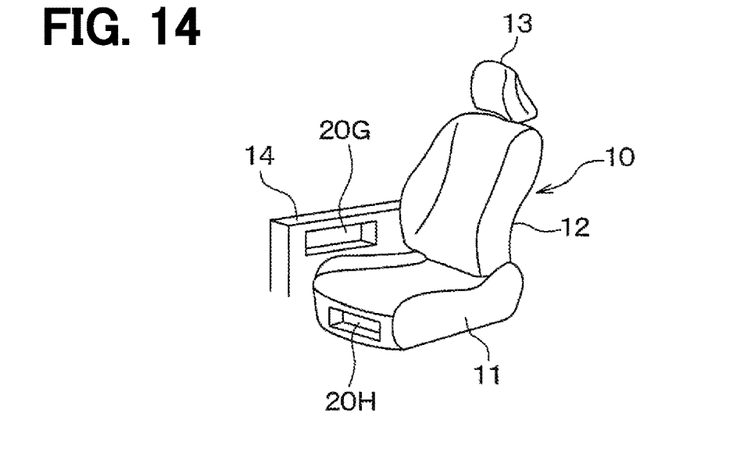
FIG. 14 is a diagram showing a modified example of the heater device of the third embodiment.

Further, as shown in FIG. 14, a planar heater 20G can be provided on an armrest 14 of the vehicle seat 10. Further, a planar heater 20H may be provided on a front side surface of a seat cushion of the vehicle seat 10 on a vehicle front side.

Further, although not shown, planar heaters can be arranged on the right side and the left side of the headrest 13 in the left-right direction.

Fourth Embodiment

Figure 15:
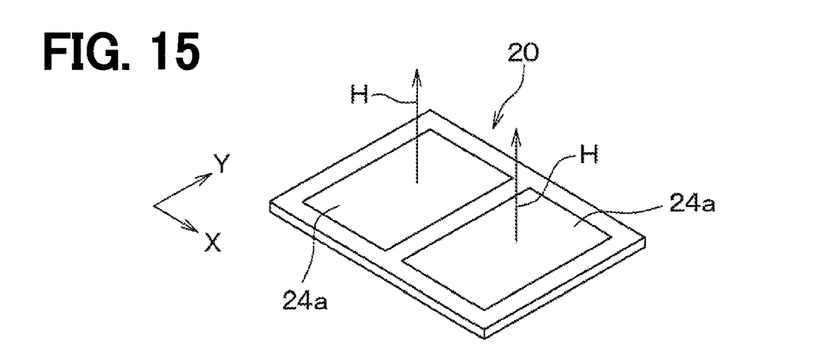
FIG. 15 is a diagram showing a heater device according to a fourth embodiment.

The heater device according to a fourth embodiment will be described with reference to FIG. 15. In the heater device of the first embodiment, for example, the first planar heater 20A and the third planar heater 20C are configured on separate insulation substrates 25, but as shown in FIG. 15, the first planar heater 20A and the third planar heater 20C can also be configured on one insulation substrate 25.

That is, the heater device of the present embodiment has a plurality of heat generating surfaces 24a that radiate radiant heat by the heat generated by the heat generating portion 24, and the plurality of heat generating surfaces 24a are dispersedly arranged on the insulation substrate 25. In this way, the plurality of heat generating surfaces 24a can be dispersedly arranged on the insulation substrate 25.

Other Embodiments (1) In each of the above embodiments, the heater device for heating the body of the occupant seated on the vehicle seat 10 arranged in the vehicle has been described, but for example, the heater device for heating a user seating on a seat provided other than the vehicle such as an aircraft can also be configured.

(2) The heater device of each of the above embodiments does not have a heat-dissipating portion, but may be configured as, for example, the device described in Japanese Patent Application Laid-Open No. 2014-3000. That is, a plurality of heat-dissipating portions formed in a thin plate shape may be formed around the heat generating portion 24, and a low thermal conductive portion having a lower thermal conductivity than the heat-dissipating portion may be formed between the plurality of heat-dissipating portions.

As a result, when the object comes into contact with the heat-dissipating portion, the heat of the part of the heat-dissipating portion that is in contact is radiated to the object, and the low thermal conductive portion suppresses heat transfer from the periphery of the specific heat-dissipating portion to the specific heat-dissipating portion. Therefore, it is possible to suppress the temperature rise of the portion in contact with the object.

(3) In each of the above embodiments, the distance between the object and the heat generating portion 24 is detected based on the change in the capacitance between the electrodes 21 and 23. On the other hand, for example, the distance between the object and the heat generating portion 24 may be detected based on the time from an irradiation of a light to a reception of the reflected light reflected by the light hitting the object.

(4) In each of the above embodiments, the distance detection unit 28 determines whether or not the distance between the object around the heat generating portion 24 and the heat generating portion 24 is equal to or less than the first detection distance L1, or is equal to or less than the second detection distance L2, or is equal to or less than the offset distance Lof.

On the other hand, the distance detection unit 28 may continuously detect the distance between the object around the heat generating portion 24 and the heat generating portion 24. Then, the control unit 29 may determine whether or not the distance detection unit 28 determines whether or not the distance between the object around the heat generating portion 24 and the heat generating portion 24 is equal to or less than the first detection distance L1, or is equal to or less than the second detection distance L2, or is equal to or less than the offset distance Lof, base on the output signal of the distance detection unit 28.

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

Overview

According to a first viewpoint shown in part or all of the above embodiments, the heater device heats the body of the user sitting on the seat, and includes the heat generating portion which is arranged in a recess recessed from the surface of the seat and is energized by the energization. Further, the heater device includes the distance detection unit that detects the distance between an object around the heat generating portion and the heat generating portion, and the control unit that controls energization of the heat generating portion. Further, the control unit includes a first control portion. The first control portion controls the energization amount of the heat generating portion so that the output of the heat generating portion becomes equal to or higher than a predetermined output, when the distance detected by the distance detection unit is longer than the offset distance between the heat generating portion and the surface of the seat. Further, the control unit includes a second control portion. The second control portion controls the energization amount of the heat generating portion so that the output of the heat generating portion becomes less than a predetermined output, when the distance detected by the distance detection unit 28 is equal to or less than the offset distance.

Further, according to a second viewpoint, the first control portion controls the energization amount of the heat generating portion so that the output of the heat generating portion increases as the distance between the object and the heat generating portion increases. Therefore, the user (occupant) can obtain a sufficient feeling of heating even when the occupant's body is separated from the vehicle seat.

Further, according to a third viewpoint, the first control portion controls the energization amount of the heat generating portion so that the output of the heat generating portion decreases at the first ratio with respect to the decrease in the distance between the object and the heat generating portion. Further, the second control portion controls the energization amount of the heat generating portion so that the output of the heat generating portion decreases at the second ratio larger than the first ratio with respect to the decrease in the distance between the object and the heat generating portion.

In this way, the second control unit controls the energization amount of the heat generating portion so that the output of the heat generating portion decreases at the second ratio larger than the first ratio with respect to the decrease in the distance between the object and the heat generating portion. Therefore, it is possible to quickly reduce the thermal discomfort given to the occupants.

Further, according to a fourth viewpoint, the heater device includes a plurality of electrodes and for detecting a change in capacitance due to the object around the heat generating portion. Then, the distance detection unit detects the distance based on the change in the capacitance between the plurality of electrodes.

In this way, the distance detection unit detects the distance based on the change in capacitance between the plurality of electrodes, so that the distance between the object around the heat generating portion and the heat generating portion can be accurately detected.

Further, according to a fifth viewpoint, the heater device includes a plurality of planar heaters having the heat generating portion. As described above, a plurality of planar heaters having the heat generating portion can be provided.

Further, according to the sixth viewpoint, the seat has the seat back that supports the entire back of the user, and the plurality of planar heaters are arranged on the upper side of the center of the seat back in the upper-lower direction.

In this way, it is possible to heat the occupant's body without contact, since the plurality of planar heaters are arranged on the upper side of the center in the upper-lower direction of the seat back.

Further, according to a seventh viewpoint, the plurality of planar heaters include the first planar heater arranged on the seat back and the second planar heater arranged on the lower side in the upper-lower direction from the first planar heater. In this way, the first planar heater and the second planar heater can be arranged side by side in the upper-lower direction.

Further, according to an eighth viewpoint, the control unit controls the energization of the heat generating portion so that the heat generation amount of the first planar heater is larger than the heat generation amount of the second planar heater.

Therefore, it is possible to control the energization of the heat generating portion so that the amount of heat generated by the first surface heater, which tends to increase the distance to the body, is larger than the amount of heat generated by the second surface heater for the occupant rather than the second surface heater. It is possible to give the user a comfortable feeling of heating.

Further, according to a ninth viewpoint, the heater device includes the substrate on which the heat generating portions are formed, and a plurality of planar heaters are dispersedly arranged on the substrate. In this way, a plurality of heat generating surfaces can be dispersedly arranged on the substrate.

Further, according to a tenth viewpoint, the heater device is arranged on one surface of the substrate so as to cover the heat generating portion, and includes a low thermal conductive portion having a lower thermal conductivity than the heat generating portion.

Therefore, when the user's body comes into contact with the low thermal conductive portion, the temperature of the contacted portion can be rapidly lowered.

The processing of S110 and S108 corresponds to the first control portion, S112 corresponds to the second control portion, and the insulation substrate 25 corresponds to the low thermal conductive portion.

What is claimed is:

1. A heater device for heating a user's body seated on a seat, comprising:
   a heat generating portion that is arranged in a recess recessed from a surface of the seat and generates heat when energized, heating a portion of the user's body that is not in contact with the seat;
   a distance detection unit that detects a distance between the portion of the user's body around the heat generating portion and the heat generating portion; and
   a control unit that controls energization of the heat generating portion, wherein
   the control unit includes
      a first control portion that controls an energization amount of the heat generating portion so that an output of the heat generating portion becomes equal to or higher than a predetermined output, when the distance detected by the distance detection unit is longer than an offset distance between the heat generating portion and the surface of the seat, and
      a second control portion that controls the energization amount of the heat generating portion so that the output of the heat generating portion becomes less than the predetermined output, when the distance detected by the distance detection unit is equal to or less than the offset distance.

2. The heater device according to claim 1, wherein
the first control portion controls the energization amount of the heat generating portion so that the output of the heat generating portion increases as the distance between the portion of the user's body and the heat generating portion increases.

3. The heater device according to claim 1, wherein
the first control portion controls the energization amount of the heat generating portion so that the output of the heat generating portion decreases at a first ratio with respect to the decrease in the distance between the portion of the user's body and the heat generating portion, and
the second control portion controls the energization amount of the heat generating portion so that the output of the heat generating portion decreases at a second ratio larger than the first ratio with respect to the decrease in the distance between the portion of the user's body and the heat generating portion.

4. The heater device according to claim 1, further comprising,
a plurality of electrodes configured to detect a change in capacitance due to the portion of the user's body around the heat generating portion, wherein
the distance detection unit detects the distance based on a change in capacitance between the plurality of electrodes.

5. The heater device according to claim 1, further comprising,
a plurality of planar heaters having the heat generating portion.

6. The heater device according to claim 5, wherein
the seat has a seat back that supports an entire back of the user, and
the plurality of planar heaters are arranged on an upper side of center of the seat back in an upper-lower direction.

7. The heater device according to claim 6, wherein
the plurality of planar heaters include an upper side planar heater arranged on the seat back and a lower side planar heater arranged on a lower side in the upper-lower direction with respect to the upper side planar heater.

8. The heater device according to claim 7, wherein
the control unit controls the energization of the heat generating portion so that a heat generation amount of the upper side planar heater is larger than a heat generation amount of the lower side planar heater.

9. The heater device according to claim 5, further comprising,
a substrate on which the heat generating portion is formed, wherein
the plurality of planar heaters are dispersedly arranged on the substrate.

10. The heater device according to claim 9, further comprising,
a low thermal conductive portion arranged on one surface of the substrate so as to cover the heat generating portion and having a lower thermal conductivity than the heat generating portion.

11. A heater device for heating a user's body seated on a seat, comprising:
   a heat generating portion that is arranged in a recess recessed from a surface of the seat and generates heat when energized, heating a portion of the user's body that is not in contact with the seat;
   a distance detector that detects a distance between the portion of the user's body around the heat generating portion and the heat generating portion; and
   a computer including a processor and a memory that stores instructions configured to, when executed by the processor, cause the processor to control an energization amount of the heat generating portion so that an output of the heat generating portion becomes equal to or higher than a predetermined output, when the distance detected by the distance detector is longer than an offset distance between the heat generating portion and the surface of the seat, and control the energization amount of the heat generating portion so that the output of the heat generating portion becomes less than the predetermined output, when the distance detected by the distance detector is equal to or less than the offset distance.

12. The heater device according to claim 11, wherein the computer causes the processor to control the energization amount of the heat generating portion so that the output of the heat generating portion increases as the distance between the portion of the user's body and the heat generating portion increases.

\* \* \* \* \*